United States Patent
Berghs et al.

(10) Patent No.: US 6,357,301 B1
(45) Date of Patent: Mar. 19, 2002

(54) METHOD AND DEVICE FOR MEASURING THE TENSILE STRESS DISTRIBUTION IN A METAL STRIP

(75) Inventors: Andre Berghs, Neunkirchen; Joachim Baumann, München; Martin Beyfuss, München; Felix Türk, München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/384,153

(22) Filed: Aug. 27, 1999

(30) Foreign Application Priority Data

Aug. 28, 1998 (DE) .......................... 198 39 286

(51) Int. Cl.⁷ ................................. G01L 1/04
(52) U.S. Cl. ................................. 73/862.451
(58) Field of Search .................... 73/160, 862.451, 73/862.453, 862.392, 862.581, 862.583, 862.632

(56) References Cited

U.S. PATENT DOCUMENTS

| | | | | |
|---|---|---|---|---|
| 3,850,031 A | * | 11/1974 | Schwenzfeier et al. | .. 73/862.41 |
| 4,304,346 A | * | 12/1981 | Kaster et al. | ................ 226/195 |
| 4,546,656 A | * | 10/1985 | Grundy et al. | ......... 73/862.473 |
| 4,587,819 A | * | 5/1986 | Hausen | ........................ 72/8.7 |
| 4,753,096 A | * | 6/1988 | Wallis | .......................... 72/196 |
| 4,860,212 A | * | 8/1989 | Uesugi | ..................... 364/472.1 |
| 5,878,933 A | * | 3/1999 | Laughery | ..................... 226/21 |
| 6,019,200 A | * | 2/2000 | Janzen et al. | ............... 188/163 |
| 6,079,261 A | * | 6/2000 | Makela | ........................ 73/160 |

FOREIGN PATENT DOCUMENTS

| | | |
|---|---|---|
| DE | 34 42 154 | 5/1986 |
| DE | 41 26 921 | 2/1993 |

* cited by examiner

*Primary Examiner*—Max Noori
(74) *Attorney, Agent, or Firm*—BakerBotts LLP (57) ABSTRACT

A method of measuring the tensile stress distribution in a metal strip between two roll stands, between a roll stand and a coiler, within a blooming stand, or upstream or downstream from a deflection roller, with the metal strip being deflected and the deflection of the metal strip being measured by two or more sensors arranged across the width of the metal strip. The tensile stress distribution in the metal strip is calculated as a function of the deflection of the metal strip. A correction is performed on the measured values of sensors in the edge area of the metal strip whose measurement area is not covered completely by the metal.

9 Claims, 8 Drawing Sheets

METHOD AND DEVICE FOR MEASURING THE TENSILE STRESS DISTRIBUTION IN A METAL STRIP

FIELD OF THE INVENTION

The present invention relates to a method and a device for measuring the tensile stress distribution in a metal strip between two roll stands or between a roll stand and a coiler. The present invention can also be used in conjunction with S rolls and blooming stands.

BACKGROUND INFORMATION

In rolling metal strips, in particular in cold rolling, the tensile stress distribution in the metal strip across the width of the metal must be determined on-line, i.e., it must be measured routinely because the tensile stress distribution is the deciding factor in regulating the flatness of a metal strip.

For example, in a conventional system, the metal strip can be guided over a measuring roll, i.e., a segmented deflection roller which has piezoelectric pressure sensors at intervals of approximately 2–5 cm. The force acting on the sensors is a measure of the tensile stress distribution. This is a contact method which can therefore leave impressions in the metal; furthermore, it is subject to wear and is thus maintenance intensive. However, one particular disadvantage of this method is that only incomplete measured values are obtained for the edge area of the metal strip, e.g., if the latter covers a piezoelectric pressure sensor only partially. Because of the great distortion of a measured value when there is only partial coverage, these measured values are discarded so that no measured values are available for the tensile stress in the edge area.

SUMMARY

An object of the present invention is to provide a method and a device for avoiding the disadvantages described above.

According to the example embodiment of the present invention, to measure the tensile stress distribution in a metal strip, the metal strip is deflected, and the deflection of the metal strip is measured by several sensors arranged across the width of the metal strip, with the tensile stress distribution in the metal strip being calculated as function of the deflection of the metal strip, and with correction of the measured values of sensors located in the edge area of the metal strip whose measurement range is not covered completely by the metal strip i.e., extends beyond the metal strip.

In an advantageous embodiment, at least one edge of the metal strip is determined by the sensors.

In another advantageous embodiment of the present invention, the metal strip is deflected periodically, and at least one edge of the metal strip is determined from a time average of the measured values supplied by the sensors over time.

In another advantageous embodiment of the present invention, the metal strip is deflected periodically, and the tensile stress distribution is determined from the amplitude of the measured values supplied by the sensors.

In another advantageous embodiment of the present invention, the measured values of sensors in the edge area of the metal strip whose measurement range is not covered completely by the metal strip are corrected as a function of the position of the edge of the metal strip.

In another advantageous embodiment of the present invention, the measured values of sensors in the edge area of the metal strip whose measurement range is not covered completely by the metal strip are corrected on the basis of stored calibration curves.

DETAILED DESCRIPTION

Figure 1:
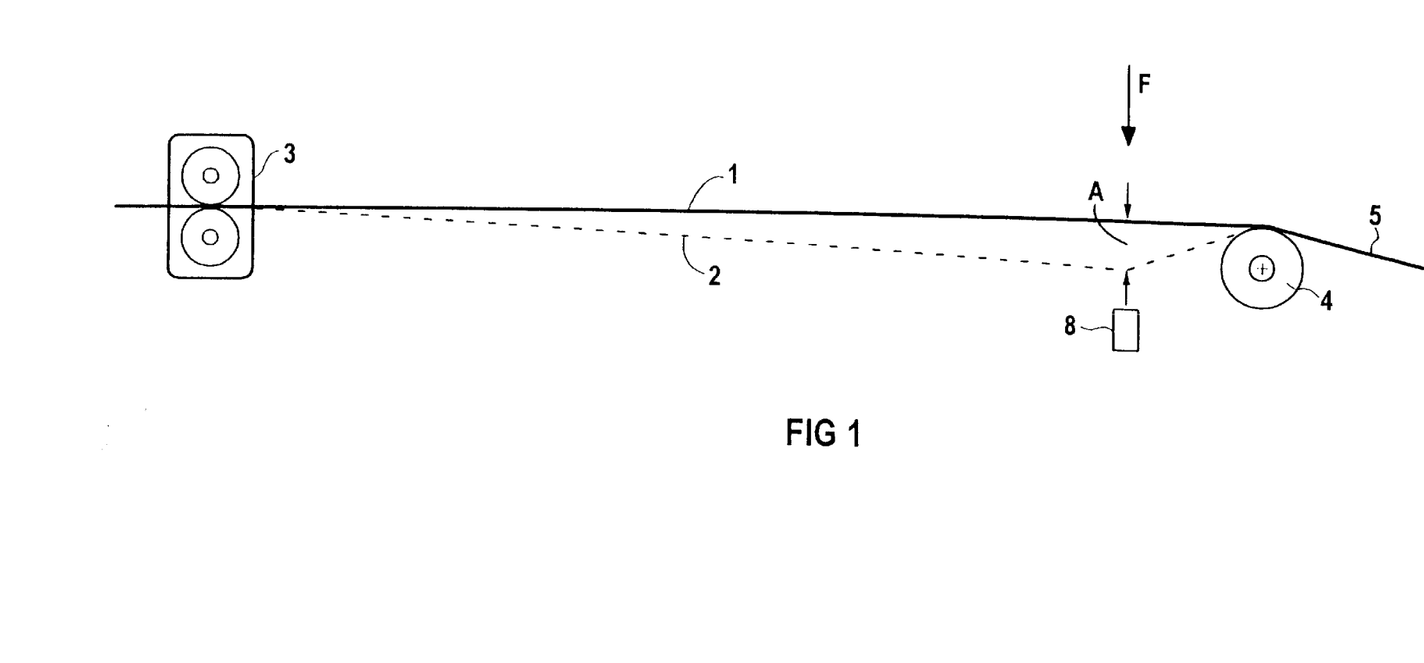
FIG. 1 shows a device for measuring the tensile stress distribution in a metal strip, according to the present invention.

FIG. 1 shows one embodiment of a device according to the present invention for measuring the tensile stress distribution in a metal strip 1. Metal strip 1 comes out of a roll stand 3 and is guided over a deflection roller 4 in the direction of arrow 5. Metal strip 1 is deflected periodically by a force F. This deflection is indicated by broken line 2. Force F is advantageously exerted by a suction device on metal strip 1, for example. A measurement device 8 is provided for measuring deflection A of metal strip 1. This measurement is advantageously performed in the vicinity of deflection roller 4.

Figure 2:
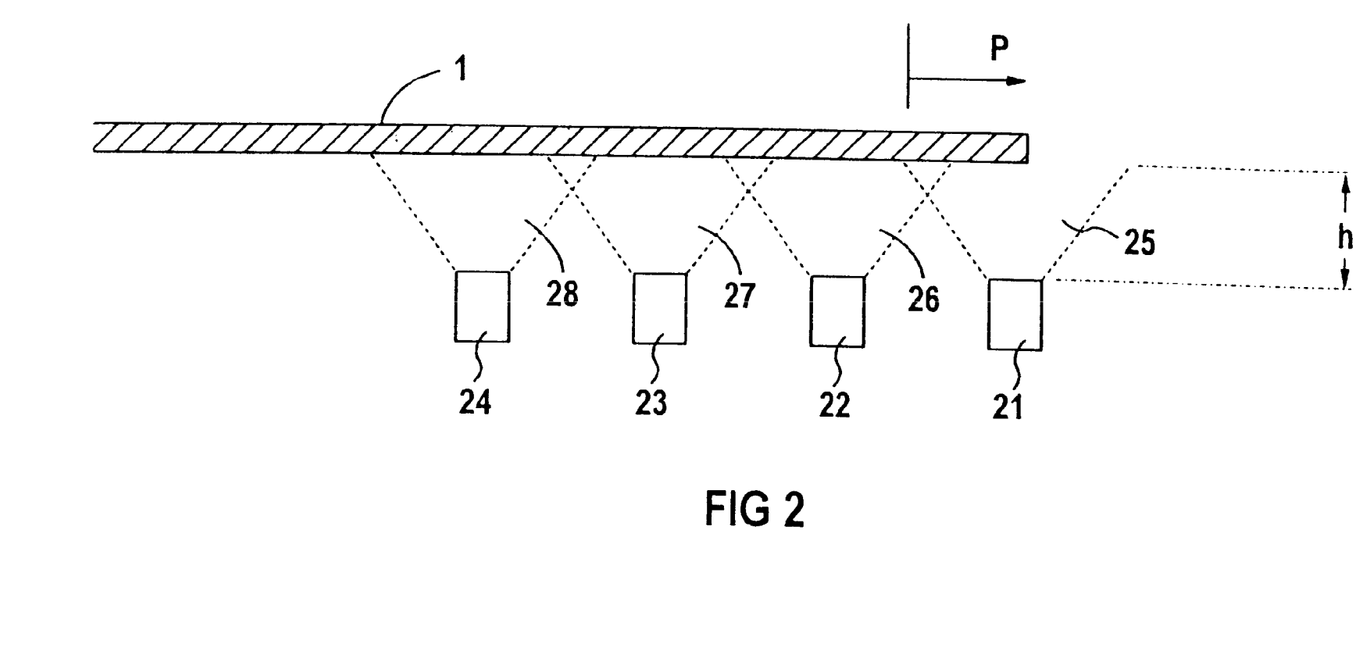
FIG. 2 shows an example embodiment of a measurement device.

FIG. 2 shows a cross-sectional view of an embodiment of a measuring device 6 from FIG. 1. This measurement device has sensors 21, 22, 23, 24. Sensors 21, 22, 23, 24 have certain measurement areas 25, 26, 27, 28 for measuring the deflection of metal strip 1. Measurement area 25 of sensor 21 however, is not covered completely by metal strip 1 and therefore it supplies distorted measured values.

Figure 3:
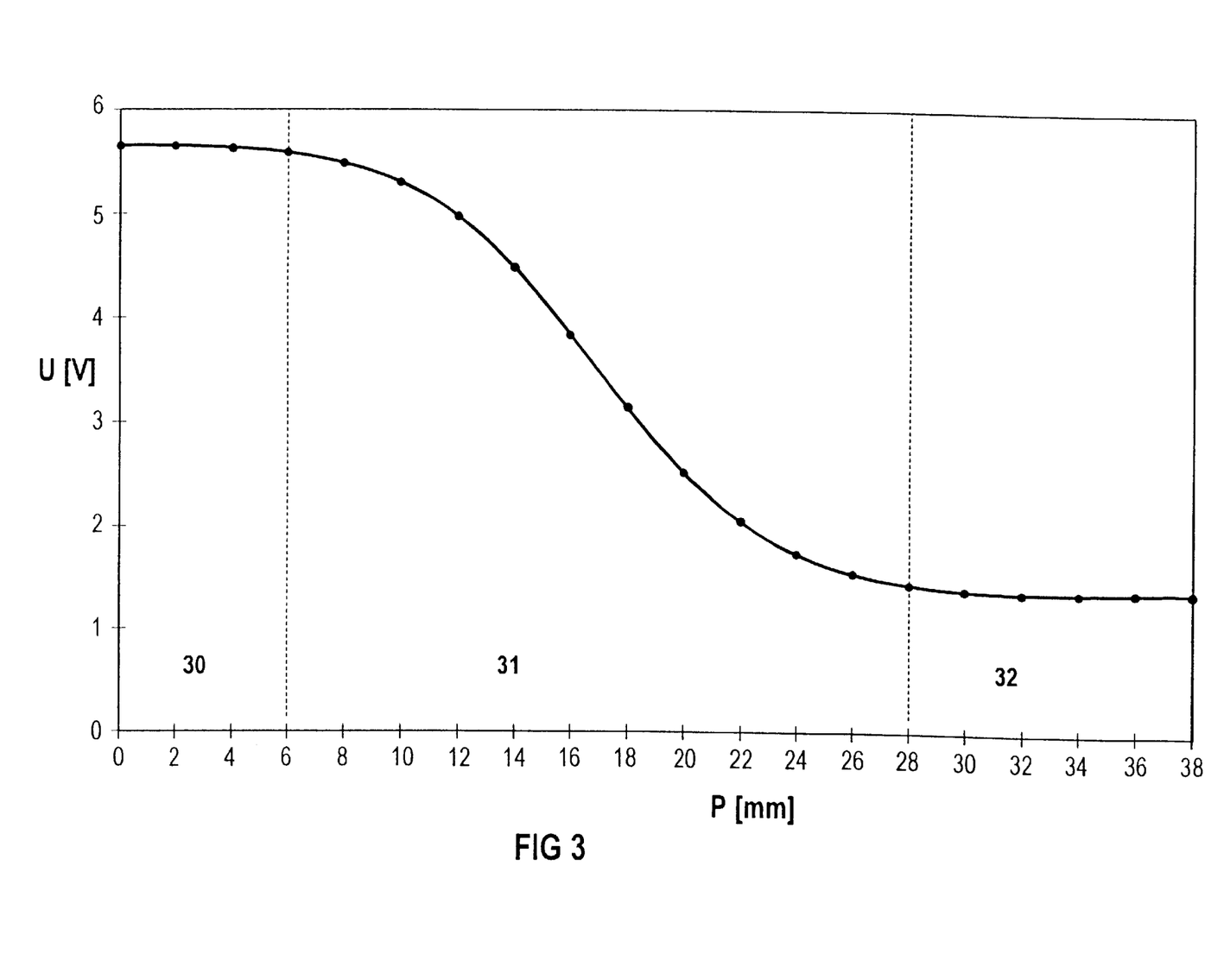
FIG. 3 shows an example of the relationship between the output voltage of a sensor and its degree of coverage.

The extent of such distortion of measured values is illustrated in FIG. 3 as an example, showing output voltage U of a sensor at a fixed distance h above its position P with respect to the metal strip. FIG. 3 shows three areas 30, 31, 32. The sensor, which covers a total measurement area of approx. 20 mm, is not covered by the metal strip in area 30. The sensor is partially covered by the metal strip in area 31. The sensor is covered completely by the metal strip in area 32.

Distance h between sensors 21, 22, 23, 24 and metal strip 1 is entered into a computer, for example, to calculate the coverage of metal strip 1; the coverage of metal strip 1 by measurement area 25 of sensor 21 is calculated by this computer. It is advantageous, however, to determine this distance on-line. To do so, the average of the output signals of sensors 22, 23, 24, which are covered completely by metal strip 1 over time, is formed. The distance of sensors 21, 22, 23, 24 from metal strip 1 is determined from this direct component.

The characteristic curve in FIG. 3 is valid only for a defined distance h. To obtain a characteristic curve for any desired distances and at the same time minimize the complexity of the calibration, the following method is used (see FIG. 4). For two distances $h_1$ and $h_2$, approximately ten measurement points represented by x's in FIG. 4 (one of which is labeled with reference number 33 as an example) at various strip edge positions P are stored. For any desired value h for which $h_1<h<h_2$, the corresponding ten measurement points can be calculated by linear interpolation. The interpolation points determined by linear interpolation are represented by circles in FIG. 4, one of which is labeled with reference number 37 as an example.

Figure 4:
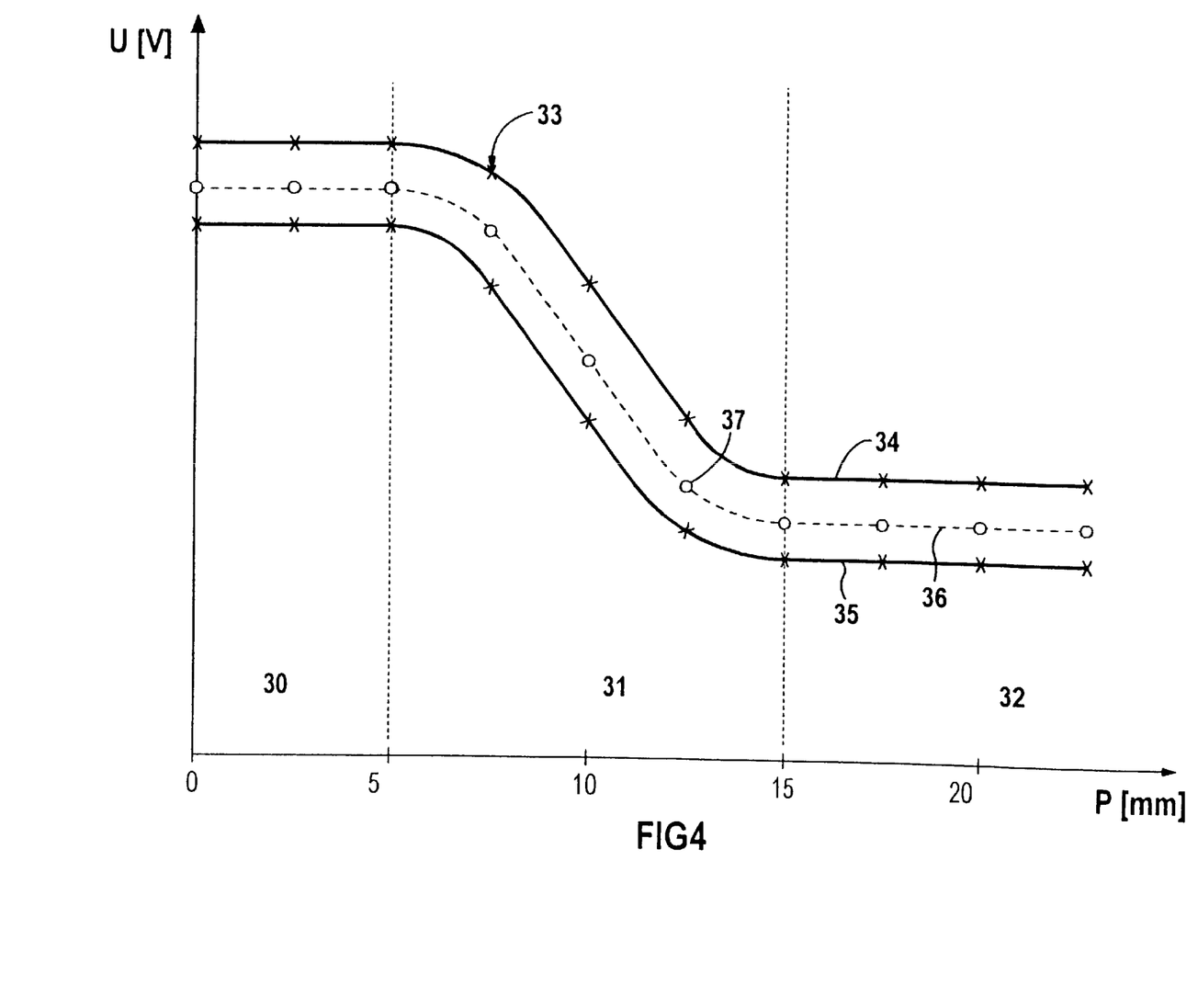
FIG. 4 shows a characteristic curve for the various distances.

A function 36 is then fitted (least squares fit) using the ten calibration values. The Fermi distribution may be used to advantage as the fit function:

$$U = a_0 \cdot \frac{1}{1 + e^{\frac{p-a_1}{a_2}}} + a_3$$

where U is the output voltage of the sensor, p is the horizontal strip edge position, and $a_0$, $a_1$, $a_2$, $a_3$ are the fit parameters which are determined by the fit algorithm.

Reference numbers 34 and 35 denote the corresponding curves for $h_2$ and $h_1$.

To determine the edge of the strip, sensor voltage U is measured and the position of the strip edge is calculated from it. To do so, the inverse function of the above equation is formed:

$$p = a_2 \cdot \ln \frac{a_0 + a_3 - U}{U - a_3} + a_1$$

If the edge of the strip is to be determined over a wide range, several sensors are placed close together, as illustrated in FIG. 2. The strip edge is analyzed by using the sensor which is only partially covered. This is the sensor for which the following expression is minimum:

$$\left| U - \frac{U_{max} + U_{min}}{2} \right|$$

$U_{max}$ is the output voltage of an uncovered sensor and $U_{min}$ is the output voltage of a completely covered sensor. Calculations referred to above are performed to advantage by using a computer system (not shown).

In this way it is possible to obtain a very accurate value for the position of the strip edge of metal strip 1. This value can be used to advantage for further control of the mill train. In addition, the measured values of sensor 21 whose measurement area 25 is not covered completely by the metal strip are corrected to advantage, so that the measured values of all sensors 21, 22, 23, 24 can be used for determining the tensile stress in metal strip 1. The amplitude of the periodic deflection of metal strip 1 is advantageously analyzed to determine the tensile stress. An example of how the tensile stress is determined from measured values for deflection of metal strip 1 is given below for additional advantageous devices for measuring tensile stress distribution in metal strip 1. Such embodiments are illustrated in FIGS. 5 and 6.

Figure 5:
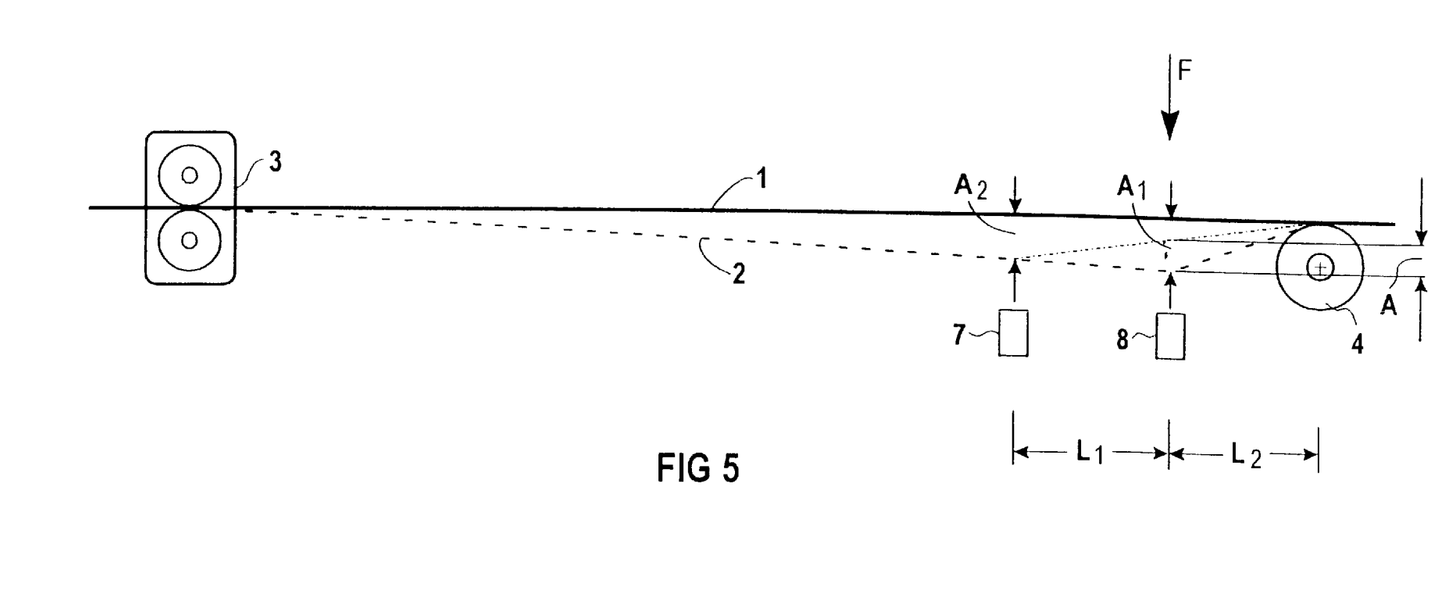
FIG. 5 shows an alternative arrangement of sensors, according to the present invention.

FIG. 5 shows the embodiment according to FIG. 1 supplemented by an additional measurement device 7.

Measurement devices 7 and 8 supply measurement signals with a great deal of noise due to various interfering factors in deflection of metal strip 1. Therefore, the measurement signals are filtered. Signals are filtered to advantage by using a digital fit algorithm or FFT analysis. Metal strip 1 is deflected in a sinusoidal pattern. Therefore, in the ideal case, the curve of the measurement signal over time during one period is a sine wave. However, interfering signals, in particular the sympathetic vibrations of metal 1 are superimposed on this sinusoidal signal. Therefore, after each full period, a sine curve is fitted to the measurement signal (by minimizing the error squares). Since the phase and frequency are known, the signal offset (basic spacing of the sensors) and the amplitude are the only parameters of the fit.

Figure 6:
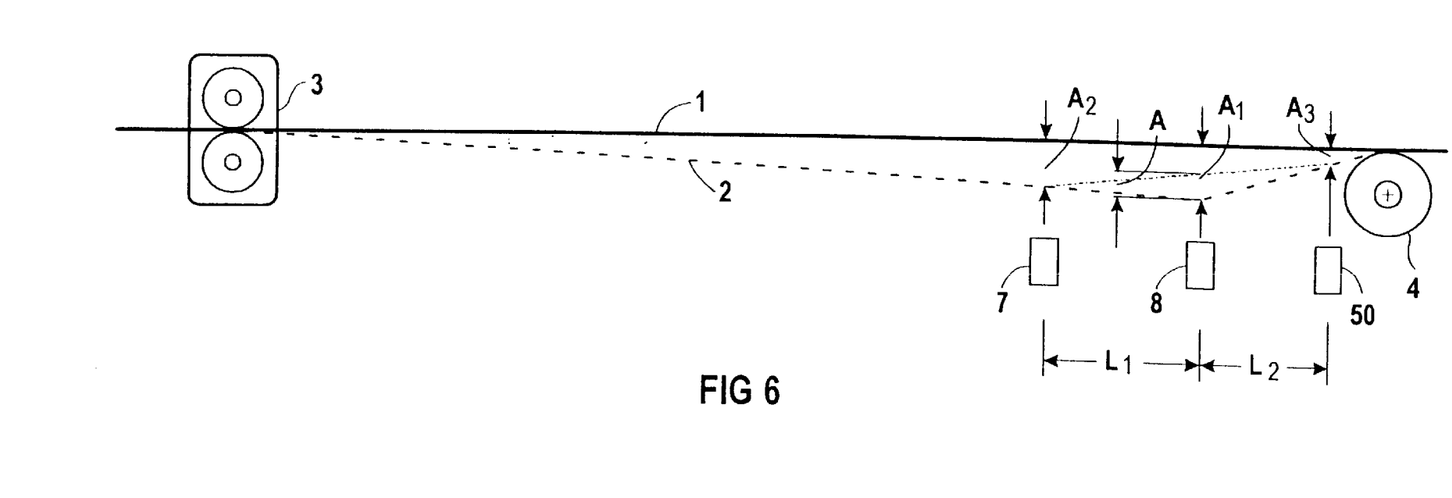
FIG. 6 shows another alternative arrangement of sensors, according to the present invention.

A further definite improvement in filtering is achieved by using two measurement devices 7 and 8 in the embodiment illustrated in FIGS. 1 and 6 and by analyzing the equation:

$$A' = A_1 - \frac{L_2}{L_1 + L_2} A_2 \tag{1}$$

A' is a measure of the curvature of metal strip 1 at the point of application of force. The curvature is small for long wavelength sympathetic vibrations, so these are effectively filtered out. However, the forced deflection produces a "bend" in metal strip 1 at the point of application of force. Thus, the information content in term A' with respect to deflection of the metal strip induced by force F is much greater than that in measurement signals $A_1$ and $A_2$ supplied by measurement devices 8 and 7.

FIG. 6 shows the arrangement of three measurement devices designed as sensor arrays in particular. A third measurement device 50 is provided for measuring a distance $A_3$.

The value for A' is advantageously corrected when using three measurement devices according to the equation $$A' = A_1 - \frac{L_2}{L_1 + L_2} A_2 - \frac{L_2}{L_1 + L_2} A_3 \tag{2}$$

This makes it possible to compensate for errors due to out-of-round deflection rollers or due to sagging of a deflection roller.

An amplitude value $A'_F$ is formed from values A' using FFT or a fit algorithm; this value corresponds in principle to amplitude value $A_F$ but instead of being formed from direct measured values, it is formed from values A'.

Amplitude distribution $A'_F(x)$ is converted into a tensile stress distribution $\sigma(x)$ according to the equation $$\sigma(x) = C(x) F(x) [1/A'_F(x) - 1/A_0]. \tag{3}$$

where x denotes the position coordinates along the width of metal strip 1.

$A'_F(x)$ is the measured amplitude distribution of the deflection calculated according to equation 1 and/or equation 2 and by the digital fit algorithm. F(x) is the force distribution by which metal strip 1 is deflected and it is determined once experimentally. C(x) is a proportionality factor incorporating the elastic constants of the material of metal strip 1. When there is a homogeneous tensile stress distribution, the amplitude at the edge of the strip is greater than that at the middle because of transverse contraction. Therefore, C(x) is a function of x. C(x) can be determined by finite element calculations.

$1/A_0$ is a term which takes into account the flexural rigidity of the sheet metal. $A_0$ is the amplitude measured when tensile stress is zero. $A_0$ is finite because of the flexural rigidity of metal strip 1. For thin metal strips, i.e., for metal strips thinner than approximately 1 mm, $1/A_0$ may be equated with zero.

Figure 7:
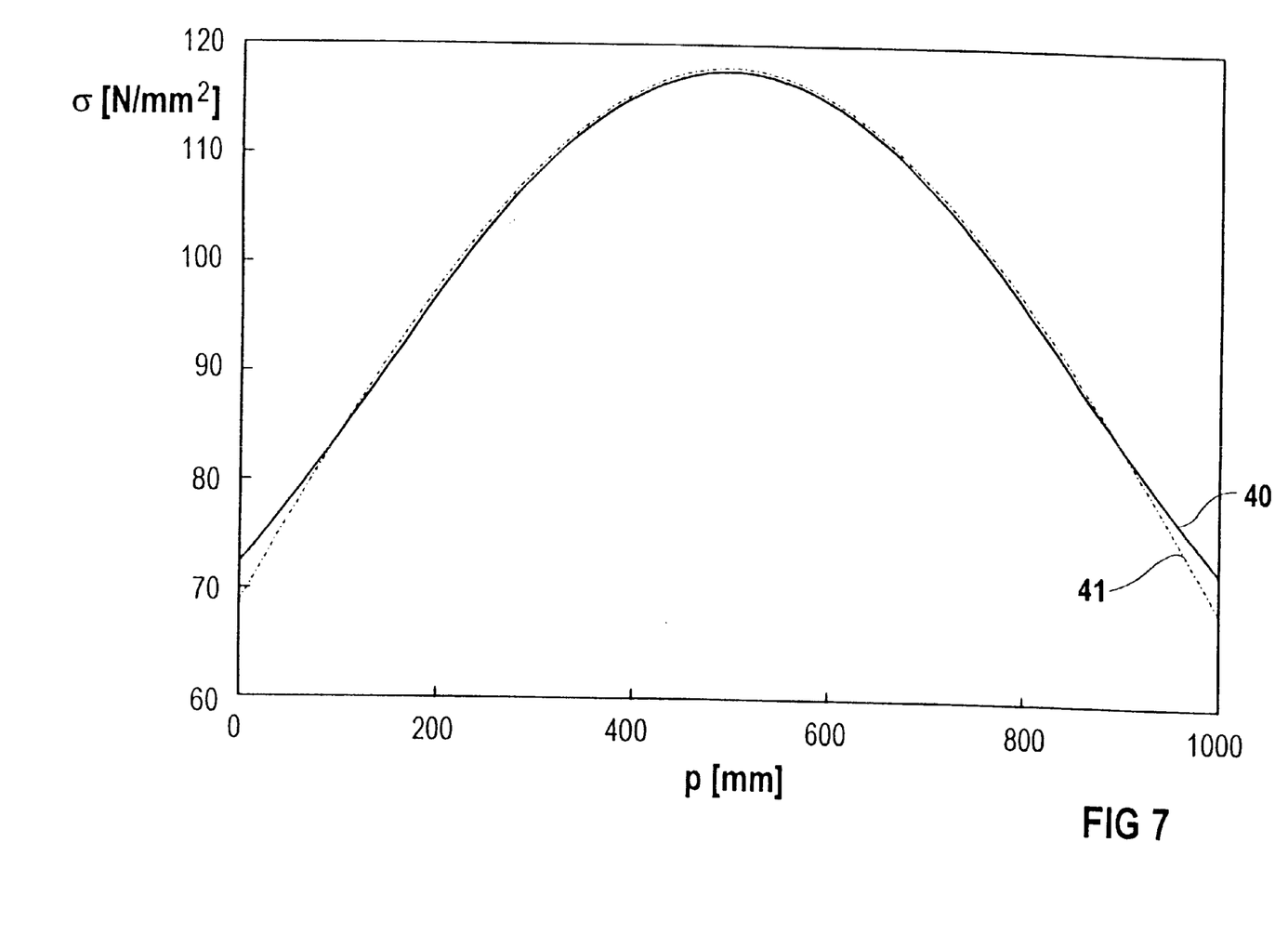
FIG. 7 shows a comparison between the actual tensile stress and the calculated tensile stress, according to the present invention.

FIG. 7 shows a curve 40 determined by the method according to the present invention as part of finite element simulation, showing a tensile stress σ in N/mm² in a metal strip plotted as a function of position x in mm on the metal strip in the transverse direction in comparison with a curve 41 of a tensile stress σ in N/mm² impressed upon the metal strip. This curve demonstrates that it is possible with the method according to the present invention to determine tensile stress σ in a metal strip with an especially high accuracy.

Figure 8:
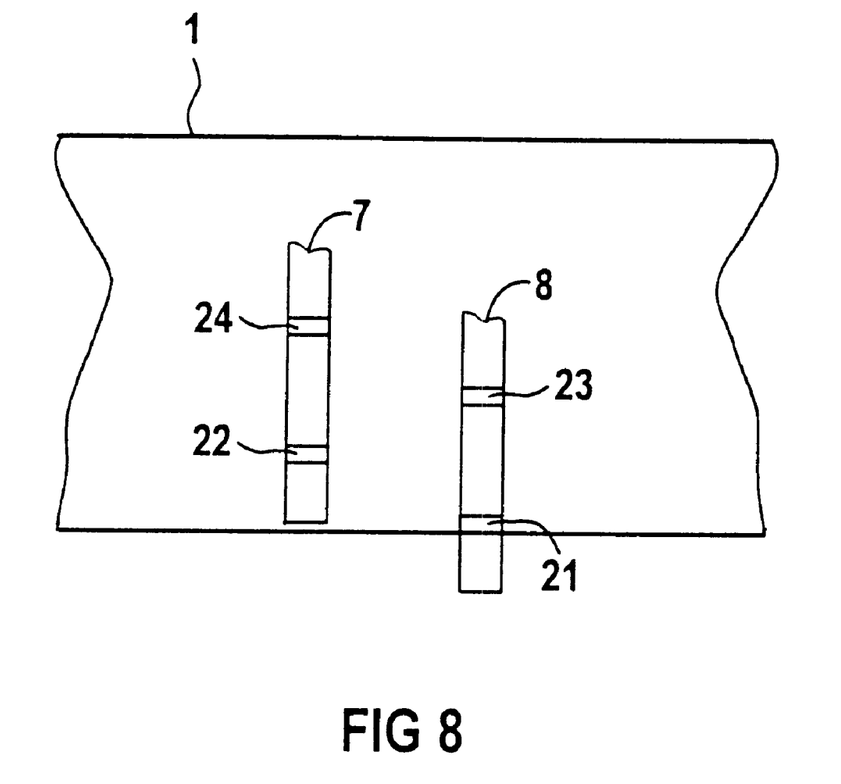
FIG. 8 shows an advantageous allocation of sensors to measurement equipment according to the present invention.

When using two measuring devices 7 and 8, as illustrated in FIG. 5, for example, sensors 21, 22, 23, 24 according to FIG. 2 are assigned to measuring devices 7 and 8 according to the diagram in FIG. 8. FIG. 8 shows a view of metal strip 1 from underneath. Thus, it is possible to reduce the number of sensors required for detecting the edge of the strip.

What is claimed is:

1. A method of measuring a tensile stress distribution in a metal strip between two roll stands, between a roll stand and a coiler, within a blooming stand, or upstream or downstream from a deflection roller, the method comprising the steps of:

periodically deflecting the metal strip by applying an air stream;

measuring the deflection of the metal strip by contactless sensors having measurement areas arranged across a width of the metal strip, the sensors providing measured values;

correcting the measured values of at least one of the sensors, the at least one of the sensors being positioned at an edge area of the metal strip and having a measurement area which extends beyond the metal strip; and determining the tensile stress distribution in the metal strip as a function of the amplitude of the deflection of the metal strip.

2. The method according to claim 1, further comprising the step of:

determining a position of at least one edge of the metal strip by the sensors.

3. The method according to 1, wherein the deflecting step includes the step of periodically deflecting the metal strip, the method further comprising the step of:

determining a position of at least one edge of the metal strip as a function of an average over time of the measured values.

4. The method according to claim 2, wherein the correcting step includes the step of correcting the measured values of the at least one of the sensors as a function of the position of the edge of the metal strip.

5. The method according to claim 1, wherein the correcting step includes the step of corrected the measured values of the at least one of the sensors as a function of stored calibration curves.

6. A device for measuring a tensile stress distribution in a metal strip between two roll stands, between one roll stand and one coiler, within a blooming stand, or upstream or downstream from a deflection roller, comprising:

a deflection device for periodically deflecting the metal strip by applying an air stream;

a first measuring device for measuring the deflection of the metal strip, the measuring device including at least two contactless sensors having measurement areas arranged across a width of the metal strip and providing measured values; and a computer device for calculating the tensile stress distribution as a function of the amplitude of the deflection of the metal strip, the computer device correcting the measured values of at least one of the sensors, the at least one of the sensors being positioned so that its measurement area extends beyond the metal strip.

7. The device according to claim 6, wherein sensors include at least one of eddy current sensors, capacitive distance sensors, optical distance sensors and ultrasonic distance sensors.

8. The device according to one of claims 6, further comprising:

a second measuring device measuring the deflection of the metal strip, the first measuring device and the second measuring device being designed as sensor arrays.

9. The device according to claim 6, further comprising:

a second measuring device and a third measuring device measuring the deflection of the metal strip, the first measuring device, the second measuring device and the third measuring device being designed as sensor arrays.

* * * * *